United States Patent [19]

Cooper

[11] 4,037,656

[45] July 26, 1977

[54] OIL RECOVERY METHOD EMPLOYING ACIDS EXTRACTED FROM CRUDES USING AN ION-EXCHANGE PROCESS

[75] Inventor: James E. Cooper, Dallas, Tex.

[73] Assignee: Mobil Oil Corporation, New York, N.Y.

[21] Appl. No.: 688,876

[22] Filed: May 21, 1976

[51] Int. Cl.$^2$ ............................................. E21B 43/22
[52] U.S. Cl. ....................................... 166/270; 166/274
[58] Field of Search .............. 166/270, 273, 274, 275; 210/24, 38 R

[56] References Cited

U.S. PATENT DOCUMENTS

| | | | |
|---|---|---|---|
| 2,288,857 | 7/1942 | Subkow | 166/266 |
| 3,111,984 | 11/1963 | Reisberg | 166/270 |
| 3,174,542 | 3/1965 | Reisberg | 166/270 |
| 3,185,214 | 5/1965 | Bernard et al. | 166/270 |
| 3,298,436 | 1/1967 | McCardell | 166/270 |
| 3,823,776 | 7/1974 | Holmes | 166/270 |
| 3,926,255 | 12/1975 | Williams | 166/273 X |
| 3,927,716 | 12/1975 | Burdyn et al. | 166/270 |
| 3,929,190 | 12/1975 | Chang et al. | 166/273 X |

OTHER PUBLICATIONS

Webster et al., "Macroreticular Ion-Exchange Resins: Some Analytical Applications to Petroleum Products," Anal. Chim. Acta., 38 (1967) pp. 193–200.

*Primary Examiner*—Stephen J. Novosad
*Attorney, Agent, or Firm*—C. A. Huggett; Henry L. Ehrlich

[57] ABSTRACT

This specification is directed to a method of producing oil from an oil-containing subterranean formation by a caustic waterflood. Oil containing carboxylic acids is passed through an ion-exchange resin to selectively remove the carboxylic acids therefrom. The removed carboxylic acids are injected into the formation in conjunction with the caustic waterflood to enhance the production of oil from the formation.

8 Claims, No Drawings

OIL RECOVERY METHOD EMPLOYING ACIDS EXTRACTED FROM CRUDES USING A ION-EXCHANGE PROCESS

BACKGROUND OF THE INVENTION

This invention is directed to a method of producing oil from an oil-containing subterranean formation. More particularly, this invention is directed to a method of concentrating carboxylic acids that are present in crude oil and re-injecting the carboxylic acids into the oil-containing subterranean formation to enhance the efficiency of a caustic waterflood method of producing oil.

Waterflooding techniques have long been employed as secondary recovery techniques for recovering oil from subterranean oil-containing formations. Generally, in accordance with these techniques, at least an injection well and a production well are provided which communicate with the reservoir and water is injected via the injection well into the reservoir and oil is produced via the production well. Many modifications of the basic waterflooding techniques have been employed. These modifications include the use of various chemicals and materials in the water injected into the formation to improve the recovery of oil therefrom. Materials have been employed in the water to thicken the water and thereby improve the efficiency of the water for driving the oil from the formation. Surfactants have been included in the water to lower the interfacial tension between the oil and water in the formation and thereby facilitate their production therefrom. Such waterfloods are referred to as surfactant or low tension waterfloods. Caustic has been added to water to carry out what is referred to as a caustic waterflood. The injection of caustic into a formation brings about a reaction of the caustic with carboxylic acids present in the oil to form a surfactant in situ.

In an article by W. R. Foster entitled "A Low-Tension Waterflooding Process", published in the Journal of Petroleum Technology, February 1973, pp. 205–210, various aspects of displacement at low tension are discussed in general terms. In addition, there is discussed a low tension waterflooding process which consists of injecting three slugs of water with different chemical compositions, which slugs are denoted as a protective slug, a surfactant slug, and a mobility control slug. The protective slug is an aqueous solution of sodium chloride. The surfactant slug has the same sodium chloride content as the protective slug and contains sacrificial chemicals which may also be incorporated in the rear portion of the protective slug. The surfactant slug also contains a selected petroleum sulfonate. The mobility control slug has a sodium chloride content that is generally less than or equal to the other two slugs and contains a water-soluble biopolymer in a concentration sufficient to provide a locally stable mobility condition at the rear of the oil bank. The sequence of three slugs can be driven through the reservoir by the original reservoir brine.

Alkaline or caustic waters have been described for flooding certain types of reservoirs. For example, in U.S. Pat. No. 1,651,311 there is described a method for recovering oil from an oil-bearing formation by injecting a strong alkali, preferably in a saturated aqueous solution, into the formation. In U.s. Pat. No. 2,288,857, there is disclosed a technique for recovering petroleum from subsurface formations by injecting into the formation an aqueous solution which aids in stripping the petroleum from the formation and depressing the interfacial tension between the petroleum and the water and which effects emulsification of the petroleum. The emulsifying agent may be formed by a reaction between the components present in the petroleum and in the aqueous solution. Thus, when using aqueous solutions containing caustic alkali such as sodium and potassium hydroxides or ammonium hydroxide or alkali salts, an emulsifying soap may be formed by the reaction between the alkali and the organic acids naturally present in the petroleum. This type of emulsifying agent is useful mainly with restricted types of asphaltic crudes having sufficient acids of the proper molecular weight to yield an emulsifying agent on reaction with alkali.

In U.S. Pat. No. 3,927,716, there is described a process for the recovery of oil from a subterranean oil reservoir, which process involves the injection of an aqueous alkaline solution to neutralize organic acids in the reservoir oil to form surfactants in situ. The alkaline solution contains sufficient alkaline agent to impart a pH within the range of 11.5 to 13 and a monovalent salt within the range of 0.5 to 2.0 weight percent. The initial aqueous alkaline slug may be followed by a second aqueous alkaline slug containing a thickening agent. In U.S. Pat. No. 3,926,255, there is described a waterflooding process in which a petroleum oil containing divalent metal soaps is contacted with an inorganic acid in order to convert the soaps to the corresponding organic acids. The organic acids thus obtained may be injected into the reservoir followed by an aqueous solution. Alternatively, the organic acids may be contacted with an aqueous alkaline solution in order to convert the acids to the corresponding surface-active monovalent salts which may be then injected into the reservoir.

In U.S. Pat. No. 3,929,190, there is described a process for the recovery of oil from a subterranean oil reservoir penetrated by spaced injection and production wells, which process involves the injection of an aqueous solution of neutralized organic acids extracted from a petroleum oil. An alkaline procedure is used for extracting the organic acids from the petroleum oil. The extract may be obtained at the oil field site or in conjunction with a refining operation. Subsequent to the injection of the aqueous extract of neutralized acids into the reservoir, a mobility-control slug may be injected in order to increase the sweep efficiency of the waterflood. In addition, a monovalent salt and an alkaline agent may be added to the aqueous extract solution prior to injection thereof.

In U.S. Pat. No. 3,823,776 there is described a technique for producing heavy oils having low acid values. By the technique there described, an oxygen-containing gas is injected into the formation to rapidly oxidize the oil and establish in the formation a stabilized in situ combustion zone. This results in the production of organic acids both in and surrounding the in situ combustion zone, thereby increasing the acid value of the oil. Thereafter, an aqueous, caustic solution is injected into the formation to quench the combustion in the situ combustion zone and flow liquid aqueous caustic solution through the in situ combustion zone and into contact with the oil in the formation on the other side thereof and oil is produced from the formation.

In a paper entitled "Macroreticular Ion-Exchange Resins: Some Analytical Applications to Petroleum Products", by P. V. Webster, J. N. Wilson, and M. C. Franks, ANAL. CHIM. ACTA, 38 (1967) pp. 193–200, there is described the use of macroreticular strong ion-exchange resins for the separation from both model solutions and petroleum products of certain polar nonhydrocarbons. It is there pointed out that Munday and Eaves showed that orthodox ion-exchange resins can be used to absorb certain basic and nonbasic nitrogen compounds, alkylphenols and naphthenic acids from both model solutions and petroleum products. Their work was limited, however, by the fact that the ion-exchange resins they used were designed for use under aqueous conditions and were relatively inefficient in reacting with bulky organic molecules and nonaqueous media. Since their work was published, macroreticular ion-exchange resins designed for use in nonaqueous media have become commercially available. They differe from orthodox resins in possessing a spongelike structure with large pores of up to 1000 A (Angstrom) diameter, which are relatively unaffected by the solvent medium. Thus, large organic molecules in hydrocarbon solution may diffuse freely within the resin phase. In addition, the resin matrix possesses great mechanical strength and unlike orthodox resins shows no marked deterioration when subjected to repeated changes from an aqueous to a nonaqueous environment. The resins that were used in the work of Webster, Wilson, and Franks were Amberlyst 29, a quaternary ammonium anion exchanger, and Amberlyst 15, a sulphonic acid cation exchanger, both manufactured by Rohm and Haas; and Deacidite K, a macroporous anion-exchange resin manufactured by the Permutit Company Limited.

SUMMARY OF THE INVENTION

This invention is directed to a method of producing oil from an oil-containing subterranean formation penetrated by an injection well and a production well. A crude oil containing carboxylic acids is contacted with an ion-exchange resin to selectively remove the carboxylic acids therefrom. The carboxylic acids are then removed from the ion-exchange resin and are injected into the formation. An aqueous, caustic solution is also injected into the formation and oil is produced therefrom via a production well.

DESCRIPTION OF THE PREFERRED EMBODIMENTS

In a caustic waterflooding method for producing oil from an oil-containing subterranean formation, a caustic solution usually having a pH of 12 and above is injected via an injection well into the formation. The caustic reacts with organic acids naturally present in the oil to form a soap (surfactant), which surfactant lowers the interfacial tension between the oil and water and thus lowers the energy requirement to move the oil through the formation to the production well. The general equation for this reaction where sodium hydroxide is injected as a caustic is:

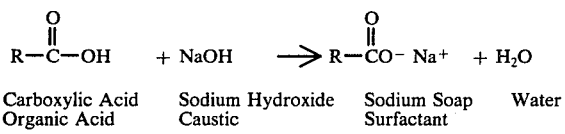

| R—C—OH | + NaOH | → R—CO⁻ Na⁺ | + H₂O |
|---|---|---|---|
| Carboxylic Acid Organic Acid | Sodium Hydroxide Caustic | Sodium Soap Surfactant | Water | where R is either an alkyl or aryl group.

Some oils do not contain sufficient amounts of naturally-occurring acids to respond favorably to caustic or alkaline waterflooding. Such oils have low acid numbers. This invention is directed to enhancing the results obtained by acustic flooding oil-containing formations containing acid-deficient oil by extracting naturally-occurring acids from a crude oil and dissolving the extracted acids in the oil to be displaced.

Acid content of petroleum products ordinarily is expressed in terms of acid number. Acid number is defined as the number of milligrams of potassium hydroxide required to neutralize the acids in 1 gram of product (mg KOH/g). With respect to this invention, the results of acid isolation is expressed in units of the number of milligrams of potassium hydroxide equivalent to the acids which have been isolated from one gram of crude (mg KOH eq/g).

In accordance with the present invention, an oil containing carboxylic acids which may be a crude oil or a refinery stream high in acid content is contacted with an ion-exchange resin to selectively remove the carboxylic acids therefrom. The carboxylic acids are then removed from the ion-exchange resin and are injected via an injection well into the formation and an aqueous caustic solution is injected into the formation. The caustic solution may be driven through the formation by the continued injection of caustic solution or the injection of water into the formation and oil is produced in a production well therefrom.

The term "crude oil" is used to mean liquid petroleum or oil as it comes out of the ground as distinguished from refined oils manufactured from it.

The practice of this invention is particularly applicable for use in those formations which contain oil that have insufficient carboxylic acid concentrations to respond favorably to caustic flooding though it may also be used in other formations to improve the efficiency of a caustic flood by concentrating the carboxylic acids naturally present in the oil and re-injecting them into the formation for more ready contact with the injected caustic. The removed carboxylic acids may, if desired, be mixed with caustic at the earth's surface, be mixed during the injection of the caustic and carboxylic acids down an injection well, or be injected into the formation and there mixed or contacted with the caustic.

In carrying out this invention the oil containing carboxylic acids that is flowed through a vessel containing the ion-exchange resin to selectively remove carboxylic acids therefrom is normally crude oil that is produced from the formation into which the removed acids are to be injected, though other crudes or refinery streams high in acid content may be used. The oil is then normally flowed from the ion-exchange vessel to a pipeline, for example, for movement to destination points. The carboxylic acids are then removed from the ion-exchange resin, for example, by flowing a caustic solution through the ion-exchange vessel and into contact with the ion-exchange resin therein. A 2-percent sodium hydroxide in methanol solution is a very efficient and therefore a preferred solution for removing the carboxylic acids from the ion-exchange resin. The carboxylic acids in conjunction with the solution used to remove them from the ion-exchange resin and any soaps which may be formed can be injected into the formation during the caustic waterflooding operation. They normally are collected in a tank, however, where they may be blended with such things as oil, salt, and an aqueous caustic solution prior to being injected into the formation.

When a caustic in alcohol solution is used to remove the carboxylic acids from the ion-exchange resin, it may be desirable to recover the alcohol for reuse. In such a case the caustic in alcohol and carboxylic acids may be treated to recover the methanol therefrom. This treatment may be carried out, for example, by passing the caustic in alcohol solution and carboxylic acids through a still where the alcohol is vaporized and recovered therefrom.

The carboxylic acids that were removed from crude oils in carrying out laboratory experiments described below were found to be insoluble in aqueous systems even at pH values of 12 and above. It is desirable in carrying out this invention that the isolated carboxylic acids, when injected via an injection well into a formation, be injected in an oil slug or in an alcohol-rich caustic slug to ensure that the acids will be displaced from the well into the formation where they will be most effective in enhancing the recovery of oil from the formation.

Ion-exchange resins that I have found to be applicable for selectively removing carboxylic acids from crude oils are quaternary ammonium resins, Amberlyst A-26 and A-29 in carbonate and hydroxide forms.

Experiments were carried out in the laboratory to isolate carboxylic acids from crude oils with the objective of being able to inject the carboxylic acids into subterranean oil-containing formations in caustic waterflooding operations to form surfactants for improving the recovery of oil from the formation. Three methods for isolating the carboxylic acids were considered (1) extracting with 1 percent sodium hydroxide in 70 percent aqueous ethanol, (2) extracting with a 0.1N aqueous sodium hydroxide, and (3) isolating the acids using ion-exchange resins.

The generalized procedure that was used for removing acids from crude oil by ion-exchange is outlined below. The column used was a chromatographic tube equipped with a stopcock. A stainless steel screen located just above the stopcock supported Ottawa sand which in turn supported the resin. Another layer of sand overlaid the resin.

Generalized Ion-Exchange Procedure for Removing Acids from Crude Oil

1. Preparation of column in OH form.
    a. Wash column with 50 ml of 1 N sodium hydroxide solution.
    b. Wash with water until effluent is neutral to pH paper.
    c. Wash with 30 ml of methanol.
    d. Wash with 30 ml of toluene.
2. Pass crude oil sample of known volume and weight through the column. Collect a sample beginning after all the toluene has been displaced. Stop collecting the sample when the oil level drops to the top of the bed.
3. Elution of sample.
    a. Wash with 20 ml of toluene.
    b. Wash with 20 ml of methanol.
    c. Wash with eluting agent which ordinarily is 100 ml of 2% sodium hydroxide in methanol. Being collecting eluate as soon as caustic solution is added to the column.
    d. Wash with 30 ml of methanol. Stop collecting eluate when the methanol level drops to the top of the bed.
4. Sample work-up.
    a. Add 100 ml of water to the eluate.
    b. Acidify with concentrated hydrochloric acid.
    c. Extract several times with ether.
    d. Wash ether with water (100 ml $\times$ 2) and saturated brine (100 ml).
    e. Dry ether solution over sodium sulfate.
    f. Filter. Add a few ml of heptane to a breaker containing the sample and evaporate to dryness on a steam bath.
    g. Transfer to a tared vial with carbon disulfide.
    h. Evaporate to dryness. Cool in a desiccator. Weigh.

The first ion-exchange experiments where performed using conventional ion-exchange resin such as Amberlite IRA 401-S and ANGA-316. These resins swelled to different degrees in different solvents and passage of the oil was almost shut off by the swollen resin. Next macroreticular resins were tried that showed about the same swelling behavior in all solvent systems. Amberlyst A-26 and A-29 were chosen for detailed study. These resins were selected on the basis of papers by P. V. Webster, J. N. Wilson, and M. C. Franks, "Macroreticular Ion-Exchange Resins: Some Analytical Applications to Petroleum Products", Anal. Chim. Acta, 38 (1967), pp. 193-200, and R. L. Gustafson and J. A. Lirio (1968), "Adsorption or Organic Ions by Anion Exchange Resins", I&EC Product Research and Development, 7, 116-120.

In an initial experiment 100 ml portions of a selected crude were passed through columns packed with 10 g. of Amberlyst resins A-26 and A-29. Methanol saturated with carbon dioxide was chosen as an eluting agent. The results of these experiments are given in Table I:

TABLE I

ELUTION OF ACIDS FROM AMBERLYST RESINS USING METHANOL SATURATED WITH CARBON DIOXIDE

| Resin | | Yield (%) | Acid No.* | Recovery Mg KOH eg/g crude |
|---|---|---|---|---|
| A-26 | 40 ml $CO_2$ in MeOH | 0.058 | 0 | — |
| A-26 | 100 ml $CO_2$ in MeOH | 0.207 | 40.8 | 0.084 |
| A-26 | 45 ml 2% NaOH in MeOH | 0.038 | 99.7 | 0.038 |
| | | | | Total 0.122 |
| A-29 | 40 ml $CO_2$ in MeOH | 0.041 | 0 | — |
| A-29 | 100 ml $CO_2$ in MeOH | 0.045 | 17.0 | 0.008 |
| A-29 | 45 ml 2% NaOH in MeOH | 0.039 | 95.0 | 0.037 |
| | | | | Total 0.045 |

*Determined by Infrared.
Acid number of residual oil from A-26 was 0.0864.
Acid number of residual oil from A-29 was 0.0952.

With reference to Table I it is shown that carbon dioxide in methanol was a weak eluting agent and fractionation occurred on the column. The first fractions eluted from both A-26 and A-29 consisted of phenols and hydrocarbons and no acids were present. The second fractions consisted of phenols and acids and the third which was eluted with 2 percent sodium hydroxide in methanol consisted only of acids. Analyses were made by infrared spectrometry. It is seen that 0.122 g KOH eq/g crude oil was eluted from A-26 while only 0.045 was eluted from A-29. In later experiments, the results of which are shown in Table II, "Comparison of Amberlyst A-26 and A-29 Resins", recoveries from the A-26 and A-29 columns were 0.160 and 0.118 mg KOH eq/g crude, respectively.

TABLE II

COMPARISON OF AMBERLYST A-26 and A-29 RESINS*

| Resin | Yield (%) | Acid No. | Recovery Mg KOH eq/g crude |
|---|---|---|---|
| A-26 | 0.27 | 59.2 | 0.160 |
| A-29 | 0.13 | 90.6 | 0.118 |

*100 ml of a selected crude and a 10-g resin bed.

A series of experiments was designed to determine the capacity of a 10-g bed of A-26 resin using charges of 50, 75, 100, and 150 ml of a selected crude oil placed on the column. The results of these experiments are shown in Table III:

TABLE III

VARIATION IN QUALITY AND QUANTITY OF ACID FRACTION WITH SIZE OF CHARGE TO A 10-g AMBERLYST A-26 COLUMN

| Charge Size (ml) | Yield (%) | Acid No. | Recovery Mg KOH eq/g crude |
|---|---|---|---|
| 50 | 0.948 | 17.2 | 0.163 |
| 75 | 0.414 | 47.2 | 0.195 |
| 100 | 0.272 | 59.2 | 0.160 |
| 150 | 0.430 | 39.3 | 0.169 |

With reference to Table III it is seen that the recovery was 0.160–0.169 mg KOH eq/g crude, except for the 75 ml charge which gave an unexplainably high value of 0.195. The experiments showed that a 10-g bed of A-26 resin can treat more than 150 ml of the selected crude but did not further test the capacity of the bed.

Eluant solvent systems for eluting the carboxylic acids from the ion-exchange resin were tested and the results thereof are shown in the following Table IV:

TABLE IV

EFFECTIVENESS OF AQUEOUS SOLVENTS IN REMOVING ACIDS ADSORBED FROM A SELECTED CRUDE FROM BEDS OF AMBERLYST A-26[1]

| Run | Yield (%) | Acid No. | Recovery Mg KOH eq/g crude |
|---|---|---|---|
| Water[2] | 0 | 0 | 0 |
| Strip[3] | 0.270 | 59.2 | 0.160 |
| Total | 0.270 | | 0.160 |
| 50% i-PrOH[4] | 0.216 | 56.4 | 0.122 |
| Strip[3] | 0.090 | 21.1 | 0.019 |
| Total | 0.306 | | 0.141 |
| 75% i-PrOH[5] | 0.297 | 38.4 | 0.114 |
| Strip[3] | 0.040 | 17.3 | 0.007 |
| Total | 0.337 | | 0.121 |
| 70% EtOH[6] | 0.11 | 89.2 | 0.098 |
| Strip[3] | 0.08 | 47.4 | 0.038 |
| Total | 0.19 | | 0.136 |

[1]100 ml of selected crude and a 10-g Amberlyst A-26 bed.
[2]2% aqueous sodium hydroxide.
[3]2% sodium hydroxide in methanol.
[4]2% sodium hydroxide in 50% aqueous i-propanol.
[5]2% sodium hydroxide in 75% aqueous i-propanol.
[6]1% sodium hydroxide in 70% aqueous ethanol.

With reference to Table IV, it is seen that no acids were eluted by 2 percent sodium hydroxide in water and that 2 percent sodium hydroxide in aqueous isopropanol and 1 percent sodium hydroxide in 70 percent aqueous ethanol left appreciable amounts of acid on the column to be stripped off by 2 percent sodium hydroxide in methanol.

Another experiment that was carried out was designed to determine the capacity of a 10-g bed of Amberlyst A-26 for acids from the selected crude and the results are shown in Table V, "Adsorption of Acids from a Selected Crude Onto Ion-Exhcange Column". Acids remaining in the crude were determined by titration. The value of 0.123 mg KOH/g crude found for the first 25 ml aliquot collected was taken as the background acidity representing unadsorbable acids and titration blank. On this basis, the aliquot collected after 275 ml had been passed through the column shows that the bed was still removing 82.5 percent of the adsorbable acids. Whether the low molecular weight acids were being displaced by the adsorption of higher molecular weight acids was not established. On the basis of this experiment, it could be concluded that 25 ml of the selected crude could be treated by one gram of Amberlyst A-26 resin.

TABLE V

ADSORPTION OF ACIDS FROM A SELECTED CRUDE ONTO ION-EXCHANGE COLUMN

| Sample No. | Volume (ml) | Acid No. of Effluent Found[1] | Net Unadsorbed | % of Adsorbable Not Adsorbed[2] |
|---|---|---|---|---|
| 1 | 25 | 0.123 | 0 | |
| 3 | 75 | 0.135 | 0.012 | 3.4 |
| 5 | 125 | 0.136 | 0.013 | 3.7 |
| 7 | 175 | 0.167 | 0.044 | 12.4 |
| 9 | 225 | 0.169 | 0.046 | 13.0 |
| 11 | 275 | 0.185 | 0.062 | 17.5 |

[1]By titration.
[2]Original acid number is 0.354.

In still another experiment, the results of which are shown in Table VI, "Recovery of Acids from Amberlyst A-26 Using 100 ml of 2% Sodium Hydroxide in Methanol", aliquots were used to elute acids which had been adsorbed on a 10-g bed of Amerblyst A-26 resin. Almost 50 percent of the acids were eluted by a first 25-ml aliquot, 75 percent by the first two aliquots, and 90 percent by the first three aliquots. Thus, 81.6 percent of the adsorbable acids from 275 milliliters of the selected crude was concentrated in 75 milliliters of eluting solution.

TABLE VI

39 RECOVERY OF ACIDS FROM AMBERLYST A-26 USING 100 ML OF 2% SODIUM HYDROXIDE IN METHANOL

| Fraction[1] | Yield (%) | Acid No. | Recovery Mg KOH eq/g crude | % |
|---|---|---|---|---|
| 1 | 0.058 | 90.1 | 0.0523 | 47.3 |
| 11 | 0.037 | 80.4 | 0.0297 | 74.2 |
| 111 | 0.023 | 71.5 | 0.0164 | 89.0 |
| IV | 0.017 | 58.0 | 0.0098 | 97.9 |
| V[2] | 0.006 | 39.1 | 0.0023 | 100.0 |
| Total | 0.141 | | 0.1105 | |

[1]25-ml portions.
[2]Methanol only.

This invention has been described above with respect to its use in conjunction with a caustic waterflood. It is to be understood, however, that it may be carried out in conjunction with other types of floods. For example, it may be carried out in conjunction with a normal waterflood.

Another embodiment of this invention is in conjunction with a normal waterflood. In accordance with this embodiment, an oil containing carboxylic acids is contacted with an ion-exchange resin to selectively remove the carboxylic acids from the oil and the carboxylic acids are removed from the ion-exchange resin as was previously described. Here, as before, the preferred ion-exchange resin is an Amberlyst macroreticular ion-exchange resin. The removed carboxylic acids are contacted with an alkaline solution to neutralize the acids and form an aqueous solution of neutralized carboxylic acids. In the case where the carboxylic acids are removed from the ion-exchange resin by contacting the ion-exchange resin with a caustic in alcohol solution, it may be desirable to recover the alcohol for repeated use in removing carboxylic acids from the ion-exchange resin. However, the alcohol may be left in the solution along with the removed carboxylic acids and injected into the formation along with the aqueous solution of neutralized carboxylic acids as later described. The alcohol will give further beneficial effects in displacing oil from the formation. Thus, the decision as to whether to recover the alcohol for later use or to inject the alcohol into the formation along with the aqueous solution of neutralized carboxylic acids is primarily an economic one. The aqueous solution of carboxylic acids is injected via an injection well into the formation and water is thereafter injected via the injection well into the formation to drive the aqueous solution of neutralized carboxylic acids through the formation toward a production well and facilitate the displacement of oil from the formation. Oil is produced via the production well from the subterranean formation. The water injected into the formation as an aqueous driving liquid may include additives such as thickening agents. The use of such additives for mobility control purposes is well known in the art as illustrated by the teachings in U.S. Pat. No. 3,929,190.

It may be desirable to adjust the concentration of the neutralized carboxylic acids in the aqueous solution prior to injecting the aqueous solution of neutralized carboxylic acids into the formation. It also may be desirable to include other additives in the aqueous solution of neutralized carboxylic acids. For example, it may be desirable to include salt in this solution, which salt would normally be sodium chloride, to obtain a desired salinity level for the aqueous solution. Teachings with respect to the concentration of the neutralized carboxylic acids in the aqueous solution and to the desired salinity for the solution are found in the before-mentioned U.S. Pat. No. 3,929,190. There an aqueous solution of neutralized organic acids is obtained by extracting organic acids from an oil by means of an alkaline extraction technique whereas the applicant's technique involves extracting carboxylic acids by means of the use of an ion-exchange resin. The extracted carboxylic acids or organic acids may be thereafter treated in a similar manner, however, by forming an aqueous solution of neutralized carboxylic acids and injecting this solution, at desired neutralized acid concentrations and desired salinities, into an oil-containing formation and driving the solution therethrough with an aqueous driving fluid.

I claim:

1. A method of producing oil from an oil-containing subterranean formation penetrated by an injection well and a production well, comprising the steps of:
 a. contacting an oil containing carboxylic acids with an ion-exchange resin to selectively remove said carboxylic acids therefrom;
 b. removing said carboxylic acids from said ion-exchange resin;
 c. injecting said removed carboxylic acids via said injection well into said formation;
 d. injecting an aqueous caustic solution via said injection well into said subterranean formation; and
 e. producing oil via said production well from said subterranean formation.

2. A method of producing oil from an oil-containing subterranean formation penetrated by an injection well and a production well, comprising the steps of:
 a. contacting an oil containing carboxylic acids with an ion-exchange resin to selectively remove said carboxylic acids therefrom;
 b. passing a solution of caustic in alcohol in contact with said ion-exchange resin to remove said carboxylic acids therefrom;
 c. contacting said removed carboxylic acids with an aqueous alkaline solution to neutralize said carboxylic acids and form an aqueous solution of neutralized carboxylic acids;
 d. injecting said aqueous solution of neutralized carboxylic acids into said formation;
 e. injecting an aqueous driving liquid via said injection well into said subterranean formation to drive said aqueous solution of neutralized carboxylic acids through said formation toward said production well; and
 f. producing oil via said production well from said subterranean formation.

3. The method of claim 2 wherein said ion-exhcange resin is an Amberlyst macroreticular ion-exchange resin.

4. The method of claim 3 wherein an aqueous caustic solution is used as a driving liquid.

5. A method of producing oil from an oil-containing subterranean formation penetrated by an injection well and a production well, comprising the steps of:
 a. contacting an oil containing carboxylic acids with an ion-exchange resin to selectively remove said carboxylic acids therefrom;
 b. passing a solution of caustic in alcohol in contact with said ion-exchange resin to remove said carboxylic acids therefrom;
 c. injecting said removed carboxylic acids via said injection well into said formation;
 d. injecting an aqueous caustic solution via said injection well into said subterranean formation; and
 e. producing oil via said production well from said subterranean formation.

6. The method of claim 5 wherein said aqueous caustic solution injected into said formation is comprised of water, said solution of caustic in alcohol and said carboxylic acids removed from said ion-exchange resin.

7. The method of claim 6 wherein said oil containing carboxylic acids that is contacted with said ion-exchange resin is oil produced from said oil-containing subterranean formation.

8. The method of claim 7 wherein said ion-exchange resin is an Amberlyst macroreticular ion-exchange resin.

* * * * *